US006483687B2

(12) United States Patent
Katooka et al.

(10) Patent No.: US 6,483,687 B2
(45) Date of Patent: Nov. 19, 2002

(54) POWER SUPPLY APPARATUS

(75) Inventors: Masao Katooka, Osaka (JP); Toru Arai, Osaka (JP); Haruo Moriguchi, Osaka (JP)

(73) Assignee: Sansha Electric Manufacturing Company, Limited, Osaka (JP)

( * ) Notice: Subject to any disclaimer, the term of this patent is extended or adjusted under 35 U.S.C. 154(b) by 8 days.

(21) Appl. No.: 09/894,816

(22) Filed: Jun. 28, 2001

(65) Prior Publication Data

US 2002/0038795 A1 Apr. 4, 2002

(30) Foreign Application Priority Data

Jul. 5, 2000 (JP) ........................................ 2000-203931

(51) Int. Cl.[7] .......................... H01H 47/00; H05B 3/02
(52) U.S. Cl. .................... 361/142; 219/481; 219/482; 219/494
(58) Field of Search ............................ 219/130.1, 136, 219/448.11, 441, 481, 482, 494; 361/18, 103, 140, 142

(56) References Cited

U.S. PATENT DOCUMENTS 5,831,240 A    11/1998   Katooka et al. ......... 219/130.1
6,051,806 A  * 4/2000   Shikata et al. ......... 219/130.31

\* cited by examiner

Primary Examiner—Shawn Riley
(74) Attorney, Agent, or Firm—Duane Morris LLP

(57) ABSTRACT

A voltage from an AC power source is converted into a DC voltage in an input-side rectifier-smoother circuit. The DC voltage is then converted into a high-frequency voltage in an inverter, and the resulting high-frequency voltage is voltage-transformed in a transformer. The voltage-transformed high-frequency voltage is converted into a DC voltage in an output-side rectifier-smoother circuit, which is applied via output terminals to a load. The input-side and output-side rectifier-smoother circuits, the inverter and the transformer are enclosed in a casing having a plastic panel. The output terminal of the apparatus is mounted on the plastic panel. When a temperature sensing unit with a temperature sensor disposed on the panel near the output terminal senses that the temperature of the panel has risen above a predetermined temperature, which is lower than the heat deformation temperature of the panel, a gate signal ON-OFF circuit prevents a gate signal from a gate signal generating circuit from being coupled to the inverter. The gate signal ON-OFF circuit permits the gate signal to be coupled to the inverter when the temperature sensing unit senses that the temperature of the panel has decreased below the predetermined temperature.

4 Claims, 2 Drawing Sheets

POWER SUPPLY APPARATUS

This invention relate to a power supply apparatus of which operation can be stopped when the temperature of the apparatus excessively rises.

BACKGROUND OF THE INVENTION

Various types of power supply apparatuses are designed for various purposes. For example, there is a power supply apparatus designed for use with welders, cutters or battery chargers. In such power supply apparatuses, for example, a commercial AC voltage is converted into a DC voltage in an input-side AC-to-DC converter, and the resulting DC voltage is converted into a high-frequency voltage in a DC-to-high-frequency converter. The resulting high-frequency voltage is then converted back into a DC voltage in an output-side high-frequency-to-DC converter, and the resulting DC voltage is applied through output terminals to a load.

The AC-to-DC converter, the DC-to-high-frequency converter, and the high-frequency-to-DC converter may be placed in a casing. Output terminals are formed to extend through a portion of a wall of the casing. The high-frequency-to-DC converter is coupled to an external load via these output terminals.

Such casing may be molded from a plastic material in order to make the power supply apparatus small and light. The output terminals of the apparatus mounted on such a plastic casing are connected to wires for connecting the apparatus to the external load. Contact resistances may be developed between the wires and the output terminals. When a large load current flows through the contact resistances, heat is generated at the contact resistances, which raises the temperatures of the output terminals.

The output terminals are also connected to the high-frequency-to-DC converter within the casing through wires. Contact resistances are present also between these wires and the output terminals. The large load current flows also through these contact resistances, which raises the temperature of the output terminals, too, for the same reason as stated above.

A utilization ratio is predetermined for a power supply apparatus for use in welding. The "utilization ratio" referred to herein is a ratio in percent of a time length for which the power supply apparatus is operated to a predetermined time length, for example, 10 minutes. Usually, the utilization ratio is, for example, 20% or 15%. This utilization ratio is determined by taking lightness, movableness and economy of production into account.

When the utilization ratio of the power supply apparatus exceeds a prescribed value, the casing, made of plastic, may be deformed when the temperature of the portion of the casing where the output terminals are mounted rises due to temperature rise of the output terminals caused by the above-described reasons. Usually, the output terminals have their outer surfaces threaded, and they are put into holes extending through the wall of the casing. Nuts are screwed onto the threaded output terminals to secure them to the casing. Accordingly, if the casing is deformed due to heat, the output terminals cannot be properly secured to the casing. It is, therefore, necessary that an operator of the power supply apparatus should be careful for the utilization ratio not to be exceeded, which may be a stress to the operator.

An object of the present invention is to provide a power supply apparatus which includes output terminals mounted on a plastic portion of a casing of the power supply apparatus, in which reliable securing of the output terminals to the casing can be maintained even when the temperature of the output terminals rises.

SUMMARY OF THE INVENTION

A power supply apparatus according to the present invention includes AC-to-DC converting means for converting a voltage from an AC power source to a DC voltage. The AC-to-DC converting means may include, for example, rectifying means for rectifying the AC voltage, and smoothing means for smoothing the output of the rectifying means. An appropriate one of various AC power sources may be used. For example, a single-phase AC power source or a three-phase AC power source may be used.

DC-to-high-frequency converting means, which may be, for example, an inverter or a chopper, converts the DC voltage outputted from the AC-to-DC converting means to a high-frequency voltage. Voltage-transforming means may be additionally used to voltage-transform the high-frequency voltage. High-frequency-to-DC converting means is provided for converting the high-frequency voltage from the DC-to-high-frequency converting means to a DC voltage for application to output terminals of the power supply apparatus. The high-frequency-to-DC converting means may include rectifying means for rectifying the high-frequency voltage and smoothing means for smoothing the output of the rectifying means.

The AC-to-DC converting means, the DC-to-high-frequency converting means and the high-frequency-to-DC converting means are housed in a casing. The casing includes a plastic panel which deforms when its temperature rises above its heat deformation temperature. The entire casing may be formed of a heat-deformable plastic.

The output terminals are arranged on the plastic panel of the casing. Temperature sensing means is mounted on the casing. The temperature sensing means may be disposed at any location, but it is desirable to dispose it in proximity to the output terminals. From the esthetical view point, it is desirable to position the temperature sensing means within the casing.

The temperature sensing means may be adapted to output a temperature-indicative signal indicative of the temperature around it. Alternatively, the temperature sensing means may be adapted to provide an output signal when the temperature of the casing has risen to a temperature above a predetermined temperature which is set at a value lower than the heat deformation temperature, and to cause such output signal to disappear when the temperature of the casing has fallen below the predetermined temperature.

Output control means is disposed in association with the temperature sensing means. The output control means operates to prevent the output of the apparatus from appearing at the output terminals when the temperature sensing means senses that the temperature of the casing has risen to a temperature above the predetermined temperature, and to cause the output of the apparatus to be developed at the output terminals when the temperature sensing means senses that the temperature of the casing has fallen below the predetermined temperature.

Other than the one described later, various configurations can be adopted for the output control means. For example, the output control means may be switched between a state in which the commercial AC power source is coupled to the AC-to-DC converting means and a state in which the commercial AC power supply is decoupled from the AC-to-DC converting means.

With the above-described arrangement, when the temperature of the casing rises above the predetermined temperature, the output control means operates to prevent the power supply apparatus output from being developed at the output terminals, so that the temperature of the casing does not rise any more. This can prevent the heat deformation of the panel. Further, since no output is developed at the output terminals, the temperature of the output terminals and, hence, the temperature of the casing gradually decreases, and when the temperature of the casing decreases below the predetermined temperature, the power supply apparatus output is developed again at the output terminals.

It is possible to cause no output to be developed at the output terminals by means of a temperature-sensitive fuse, which melts when the temperature of the output terminals rises above a predetermined temperature.

However, in such arrangement, the molten fuse must be replaced with a new fuse in order to make the power supply apparatus operate again. The replacement of fuses is troublesome. In contrast, according to the present invention, the operable condition of the power supply apparatus is automatically recovered when the temperature of the casing decreases.

The DC-to-high-frequency converting means may include at least one semiconductor switching means which is rendered operative when a control signal is applied thereto from means for controlling the DC-to-high-frequency converting means and continues to be conductive as long as the control signal is present. In this case, the output control means may be interposed between the means for controlling the DC-to-high-frequency converting means and the semiconductor switching means Then, the output control means operates to prevent the control signal from being supplied to the semiconductor switching means when the temperature sensing means senses that the temperature of the casing has risen above the predetermined temperature. When the temperature sensing means senses that the temperature of the casing has fallen below the predetermined temperature, the output control means permits the semiconductor switching means control signal to be supplied to the semiconductor switching means.

With this arrangement, the power supply apparatus is made to provide and remove an output to and from the output terminals by making the output control means operate to couple and decouple the control signal to and from the DC-to-high-frequency converting means. Therefore, the output control means need not interrupt a large current or voltage directly. Accordingly, the output control means need not have large current capacity and, therefore, can be of a simple arrangement.

The temperature sensing means may be disposed on the panel in the vicinity of the output terminals so that the temperature sensed by the sensor can be very close to that of the output terminals, and, therefore, the heat deformation of the panel can be more precisely prevented.

The temperature sensing means may be attached to the output terminals of the apparatus. With this arrangement, since the temperature of the output terminals which has risen above a predetermined temperature cannot decrease rapidly, the interval during which no output is provided at the output terminals can be relatively long.

DETAILED DESCRIPTION OF PREFERRED EMBODIMENTS

Figure 1:
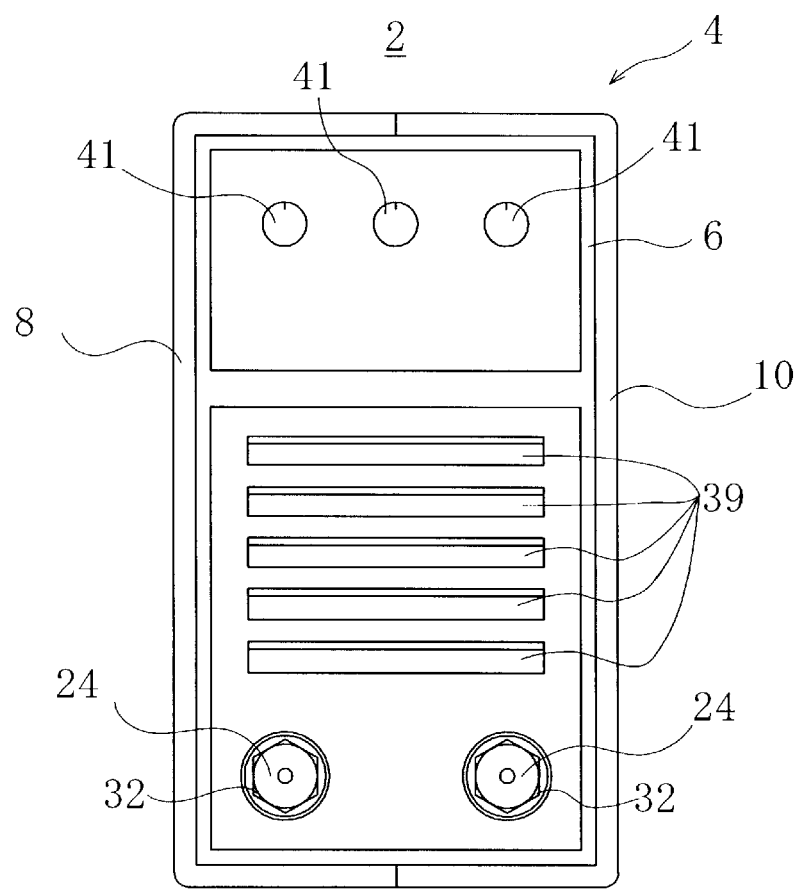
FIG. 1 is a front elevational view of a power supply apparatus according to a first embodiment of the present invention.

A power supply apparatus 2 according to a first embodiment of the present invention may be used with a welder or a cutter, for example. As shown in FIG. 1, the power supply apparatus 2 includes a casing 4 which is generally of a shape of a rectangular parallelepiped. The casing 4 includes a front panel 6 and a rear panel (not shown) disposed in parallel with the front panel 6 with a spacing disposed therebetween. The space defined by the front and rear panels is enclosed by side panels 8 and 10 to thereby form the casing 4. The casing 4 is formed of a plastic material which may be deformed when the temperature of the casing 4 increases above the heat deformation temperature of the plastic material.

Figure 3:
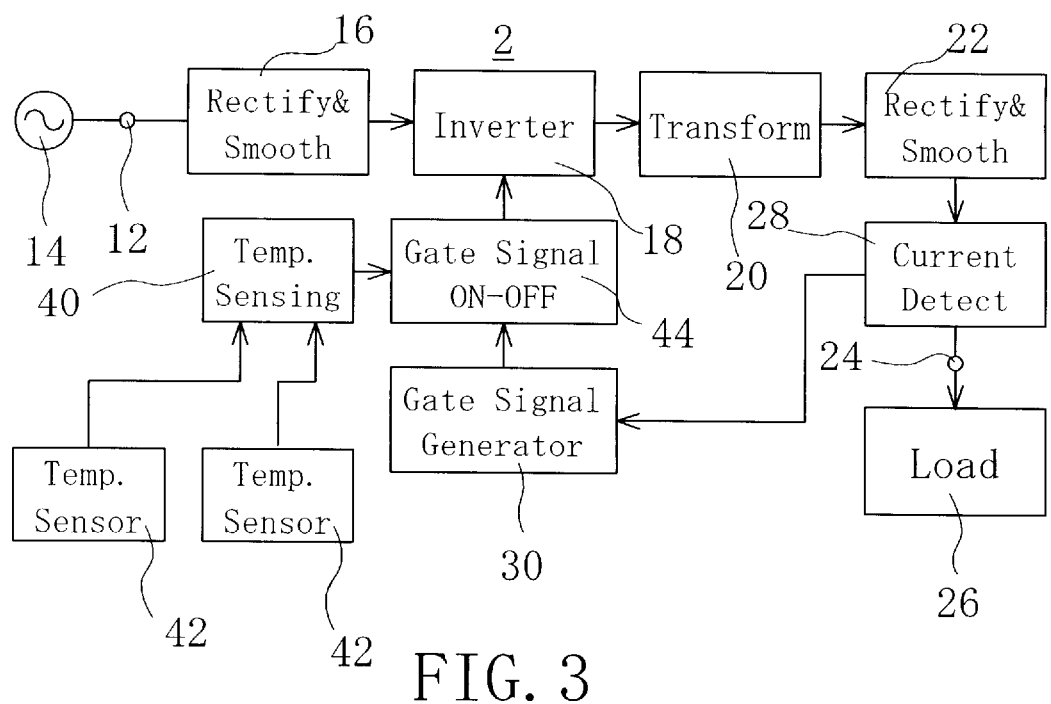
FIG. 3 is a block circuit diagram of the power supply apparatus shown in FIG. 1.

A circuit shown in FIG. 3 is arranged within the casing 4. A commercial AC power source 14 is connected to a power supply input terminal 12 disposed on, for example, the rear panel. The AC voltage from the commercial AC power source 14 is applied to input-side AC-to-DC converting means, e.g. an input-side rectifying and smoothing section 16, where it is converted into a DC voltage. The input-side rectifying and smoothing section 16 is formed of rectifying means, e.g. a full-wave or half-wave rectifier circuit, for rectifying the commercial AC voltage, and smoothing means, e.g. a smoothing capacitor, for smoothing the output of the rectifier circuit.

The DC voltage from the input-side rectifying and smoothing section 16 is applied to DC-to-high-frequency converting means, where it is converted into a high-frequency voltage. The DC-to-high-frequency converting means may include, for example, an inverter 18, which converts the DC voltage applied thereto into a high-frequency voltage. The inverter 18 includes at least one semiconductor switching device, e.g. a bipolar transistor, an IGBT or a FET, which is switched at a high-frequency to thereby convert the DC voltage into a high-frequency voltage. The high-frequency voltage from the inverter 18 is applied to a voltage transformer 20 which forms a part of high-frequency-to-DC voltage converting means, where it is voltage-transformed.

The high-frequency voltage from the transformer 20 is applied to output-side high-frequency-to-DC converting means, e.g. an output-side rectifying and smoothing section 22, where it is converted into a DC voltage. The output-side rectifying and smoothing section 22 has rectifying means, e.g. a full-wave or half-wave rectifier circuit, for rectifying the high-frequency voltage, and smoothing means, e.g. a smoothing reactor, for smoothing the DC output of the rectifier circuit.

The DC voltage from the output-side rectifying and smoothing section 22 is coupled to a load 26 formed of, for example, a workpiece and a torch, via two output terminals 24. Detecting means, e.g. a current detecting section 28, is disposed between the output terminals 24 and the output-side rectifying and smoothing section 22, to detect a load current supplied to the load 26. The current detecting section 28 develops a load current representative signal representing the load current. Alternatively, a load voltage or a load power may be detected.

The load current representative signal is applied to means, e.g. a gate signal generating section 30, for controlling the DC-to-high-frequency converting means. The gate signal generating section 30 applies a control signal, e.g. a gate signal, to the inverter 18. During the presence of the gate signal applied to the inverter 18, the semiconductor switching device of the inverter 18 is conductive. The time interval during which the gate signal is present, i.e. the conduction period of the semiconductor switching device, is so controlled in the gate signal generating section 30 that the difference between the load current representative signal, for example, and a reference signal can be substantially zero. In other words, the conduction period of the semiconductor switching device is so controlled as to make the load current corresponding to the reference signal flow. Thus, the power supply apparatus 2 is constant current controlled. When what is detected is a load voltage or load power, the apparatus 2 is constant voltage or constant power controlled.

Figure 2:
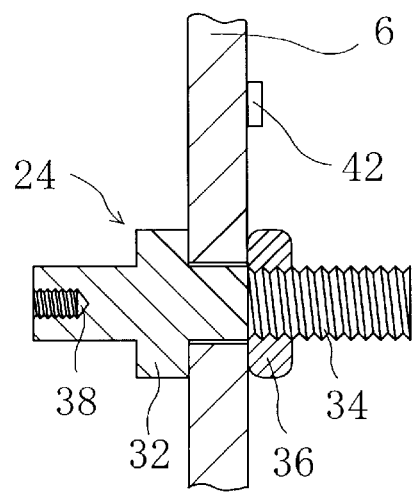
FIG. 2 is a cross-sectional view of an output terminal and a portion of a panel around the output terminal of the power supply apparatus shown in FIG. 1.

As shown in FIG. 2, the output terminals 24 are made of metal and extend through a lower portion of the front panel 6. The output terminals 24 have a generally cylindrical shape. A hexagonal securing part 32 is provided for each of the output terminals 24 in a portion to be located outside the panel 6. The side of the part 32 facing the outer surface of the panel 6 is adapted to contact with the panel 6. That portion of each output terminal 24 which is to be located inside the panel 6 is provided with an external thread 34. When a nut 36 is screwed onto the thread 34, the panel 6 is tightly sandwiched between the hexagonal securing part 32 and the nut 36, whereby each output terminal 24 is secured to the front panel 6. The inside portion of each output terminal 24 provided with the external thread 34 is connected to the current detecting section 28 by means of a wire (not shown). The tip end of the outside portion of each output terminal 24 is provided with an internal thread 38 for connection of that output terminal 24 to the torch or the workpiece by means of a wire.

The connection of wires to the outside and inside portions of each output terminals 24 produces a contact resistance between each wire and the associated output terminal 24. Since a large load current flows through the output terminals 24, the temperature of each output terminal 24 increases. The temperature rise is transmitted to the front panel 6. When the temperature of the front panel 6 increases above the heat deformation temperature of the panel 6, the panel 6 will be thermally deformed. This changes the sandwiching of the font panel 6 by the securing part 32 and the nut 36, resulting in loosening of the output terminals 24.

Within the casing 4, a fan (not shown) is mounted for cooling heat generating devices, such as the semiconductor switching device of the inverter 18 and rectifying diodes of the input-side and output-side rectifying and smoothing sections 16 and 22. Elongated openings or slits 39 are formed in the front panel 6, as shown in FIG. 1, through which air for cooling the heat generating device are taken into or driven out of the casing 4. Similar openings are formed in the rear panel in the portion corresponding to the portion of the front panel 6 where the openings 39 are formed, so that a path for air is formed, along which air can flow to cool the heat generating devices. The output terminals 24, however, is located at a level lower than the openings 39. In other words, the output terminals are outside the path of the cooling air. Therefore, much cooling effect cannot be expected from the fan on the output terminals 24.

Reference numerals 41 shown in FIG. 1 denote control knobs for setting the load current and other functions.

The power supply apparatus 2 is provided with a temperature sensing section 40 shown, for example, in FIG. 3. Two temperature sensors 42 are connected to the temperature sensing section 40. The temperature sensors 42 are disposed on the inside surface of the front panel 6 at locations near the respective output terminals 24 as shown in FIG. 2. The sensors 42 are secured to the panel 6 by, for example, screws or adhesive. The temperature sensors 42 sense temperatures around the respective output terminals 24 and develop temperature-representative signals representing the temperatures they sense. The respective temperature-representative signals are applied to the temperature sensing section 40. The temperature sensing section 40 develops a temperature rise signal when either one of the temperature-representative signals increases above a temperature reference signal corresponding to a predetermined temperature which is set at a value lower than the heat deformation temperature of the panel 6. When the temperature-representative signal decreases below the temperature reference signal, the temperature rise signal disappears.

The temperature rise signal is applied to output control means, e.g. a gate signal ON-OFF section 44. The gate signal ON-OFF section 44 is interposed between the gate signal generating section 30 and the inverter 18 and operates to prevent the gate signal from being applied from the gate signal generating section 30 to the inverter 18 when the temperature rise signal is applied from the temperature sensing section 40 to the gate signal ON-OFF section 44. During a period during which the temperature rise signal is not applied to it, the gate signal ON-OFF section 44 couples the gate signal to the inverter 18.

Thus, when the temperature rise of one or both of the output terminals 24 causes the temperature of the front panel 6 to rise above the predetermined temperature, which is lower than the heat deformation temperature, the gate signal is not applied to the inverter 18, and, as a result, no load current flows through the output terminals 24. Accordingly, the temperatures of the output terminals 24 and, hence, the temperature of the front panel 6 stop rising any more, but start to decrease gradually. When the temperature of the front panel 6 decreases below the said predetermined temperature, the temperature rise signal disappears, and the gate signal is applied again to the inverter 18 to operate it so as to allow the load current to flow again.

As described above, when the temperature of the front panel 6 rises too high, the supply of the load current is stopped, and, therefore, the temperature decreases gradually. In this manner, deformation of the front panel 6 is prevented. Further, when the temperature of the front panel 6 decreases below the heat deformation temperature of the panel 6, the supply of the load current is automatically resumed. Accordingly, there is no need for troublesome replacement of a fuse.

The above-described power supply apparatus 2 is so arranged that when the temperature of the front panel 6 rises above the predetermined temperature, which is lower than the heat deformation temperature of the panel 6, the gate signal is interrupted. The value of the gate signal is very small relative to the load current and the current supplied to the input-side rectifying and smoothing section 16. Accordingly, the current capacity of the gate signal ON-OFF section 44 can be very small, which enables the power supply apparatus 2 to be downsized.

In contrast, it may be possible to interrupt input current to the input-side rectifying and smoothing section 16 or to interrupt output current from the output-side smoothing section 22 when the temperature rise signal is developed in the temperature sensing section 40. Such an arrangement, however, would requires a large current capacity interrupting device, which would make the power supply apparatus 2 larger in size.

The temperature sensing section 40 may have a contact which is opened or closed to control the gate signal ON-OFF section 44 when the temperature sensed by the temperature sensors 42 is above a predetermined temperature.

Figure 4:
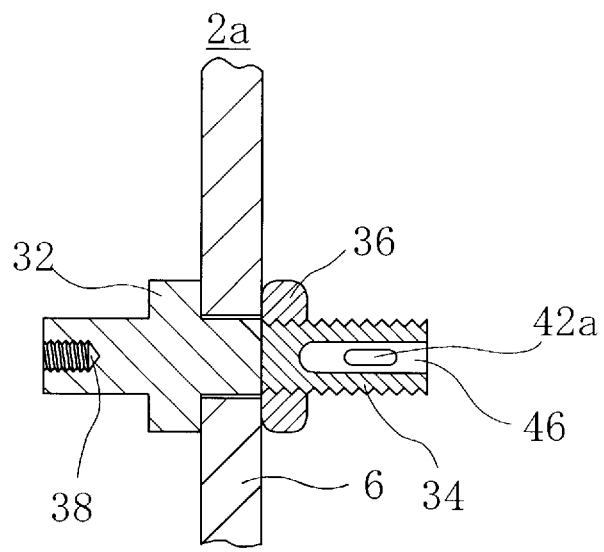
FIG. 4 is a cross-sectional view of an output terminal and a portion of a panel around the output terminal of a power supply apparatus according to a second embodiment of the present invention.

A power supply apparatus 2a according to a second embodiment of the present invention is arranged similar to the apparatus shown in FIGS. 1–3 except for the locations of the temperature sensors, as shown in FIG. 4. In FIG. 4, those components which are shown in FIGS. 1–3 are assigned with the same reference numerals as used in FIGS. 1–3, and the description about them is not made.

Two temperature sensors 42a are embedded in the respective output terminals 24. More specifically, a cavity 46 is formed to extend into each output terminal 24 from its inner end surface. In each of the cavities 46, the temperature sensor 42a is secured by means of, for example, adhesive. The configuration and operation of each temperature sensor 42a are similar to those of the temperature sensors 42 used in the apparatus of the first embodiment.

The output terminals 24, being made of metal, have large heat capacity and, therefore, hardly cooled down once their temperatures rises above the predetermined temperature (lower than the heat deformation temperature of the panel 6). In other words, once the temperature rise signal is developed by the temperature sensing section 40, it hardly disappears. Accordingly, the time length during which the gate signal is decoupled from the inverter 18 is longer than the time length available for the apparatus according to the first embodiment. Then, the front panel 6 can be sufficiently cooled down before the power supply apparatus is operated again, which eliminates the need for frequent interruption of the operation of the apparatus and, therefore, can improve the working efficiency.

The casing 4 has been described as being entirely formed of a plastic material, but plastic may be used only for the panel on which the output terminals 24 are mounted.

Also, the present invention can be implemented not only in power supply apparatuses for welders or cutters, it may be implemented in power supply apparatuses for other uses. For example, it may be implemented in a power supply apparatus for charging batteries. In this case, if excessive output is derived from the power supply-apparatus by the battery charger due to, for example, short-circuiting in the battery, the power supply apparatus can be prevented from burning. Thus, the present invention can increase safety.

In place of the inverter 18, other device, e.g. a chopper may be used as DC-to-high-frequency converting means.

Also, instead of using two temperature sensors for the respective output terminals 24, only one temperature sensor may be mounted on only one of the output terminals 24.

What is claimed is:

1. A power supply apparatus comprising:

AC-to-DC converting means for converting an AC voltage from an AC power source into a DC voltage;

DC-to-high-frequency converting means for converting said DC voltage into a high-frequency voltage;

an output terminal;

high-frequency-to-DC converting means for converting said high-frequency voltage into a DC voltage for application to said output terminal;

a casing enclosing said AC-to-DC converting means, said DC-to-high-frequency converting means and said high-frequency-to-DC converting means, said casing including a plastic panel on which said output terminal is mounted, said plastic panel being subject to heat deformation when the temperature of said plastic panel rises above a heat deformation temperature of said plastic panel;

temperature sensing means mounted on said casing; and output control means for causing an output of said power supply apparatus not to appear at said output terminal when said temperature sensing means senses that the temperature of said casing has risen above a predetermined temperature set at a value lower than said heat deformation temperature, and for causing said output of said power supply apparatus to appear at said output terminal when said temperature sensing means senses that the temperature of said casing has decreased below said predetermined temperature.

2. The power supply apparatus according to claim 1 wherein:

said DC-to-high-frequency converting means includes at least one semiconductor switching means which is rendered conductive during a time interval during which a control signal applied thereto from means for controlling said DC-to-high-frequency converting means is present; and said output control means is interposed between said means for controlling said DC-to-high-frequency converting means and said semiconductor switching means, said output control means preventing said control signal from being applied to said semiconductor switching means when said temperature sensing means senses that the temperature of said casing has risen above said predetermined temperature, said output control means permitting said control signal to be applied to said semiconductor switching means when said temperature sensing means senses that the temperature of said casing has decreased below said predetermined temperature.

3. The power supply apparatus according to claim 1 wherein said temperature sensing means is disposed on said panel at a location in the vicinity of said output terminal.

4. The power supply apparatus according to claim 1 wherein said temperature sensing means is attached to said output terminal.

* * * * *